US012444919B1

(12) United States Patent
Aria et al.

(10) Patent No.: US 12,444,919 B1
(45) Date of Patent: Oct. 14, 2025

(54) SYSTEM FOR OPERATION OF ENHANCED CIRCUIT BREAKERS

(71) Applicant: AMAZON TECHNOLOGIES, INC., Seattle, WA (US)

(72) Inventors: Behrad Aria, Alameda, CA (US); David Buuck, Port Ludlow, WA (US); Alin Theodor Iacob, Sunnyvale, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 149 days.

(21) Appl. No.: 18/191,504

(22) Filed: Mar. 28, 2023

(51) Int. Cl.
*H02H 3/00* (2006.01)
*H02H 1/00* (2006.01)
*H02H 5/04* (2006.01)

(52) U.S. Cl.
CPC ............ *H02H 3/00* (2013.01); *H02H 1/0007* (2013.01); *H02H 5/047* (2013.01)

(58) Field of Classification Search
CPC ......... H02H 3/00; H02H 1/0007; H02H 5/047
USPC ......................................................... 361/42
See application file for complete search history.

(56) References Cited

U.S. PATENT DOCUMENTS

| 2014/0226247 | A1* | 8/2014 | Gaxiola | ................ | H02H 3/087 |
| | | | | | 361/100 |
| 2016/0155587 | A1* | 6/2016 | Jaenicke | .............. | H01H 33/596 |
| | | | | | 307/113 |
| 2017/0098931 | A1* | 4/2017 | Gerdinand | ............ | H02H 3/087 |
| 2020/0365345 | A1* | 11/2020 | Telefus | ................. | H01H 71/24 |
| 2023/0275417 | A1* | 8/2023 | Mehraeen | ............. | H02H 3/021 |
| | | | | | 361/1 |

OTHER PUBLICATIONS

"Understanding Solid State Relays (SSR)", Blog—Expertise & Innovations—Solid State Relays—Zero-cross or random relay : what are the differences?, Retrieved from the Internet: URL: https://www.celduc-relais.com/en/zero-cross-or-random-relay-what-are-the-differences.
"Zero crossing control", Wikipedia 1 page. Retrieved from the Internet on Feb. 23, 2023. URL: https://en.wikipedia.org/wiki/Zero_crossing_control.
Castillo, et al., "Boost Switching Safety with a Zero-Crossing Relay Driver", Electronic Design, Prevent arcing and extra power loss in a relay circuit by timing its switching at zero-crossing with a high-voltage GreenPAK IC, Jul. 20, 2021, Retrieved from the Internet: URL: https://www.electronicdesign.com/technologies/analog/article/21169672/dialog-semiconductor-boost-switching-safety-with-a-zerocrossing-relay-driver.

* cited by examiner

*Primary Examiner* — Sreeya Sreevatsa
(74) *Attorney, Agent, or Firm* — Lindauer Law, PLLC

(57) ABSTRACT

An enhanced circuit breaker in an alternating current (AC) electrical distribution system offers improved safety and control over an attached load. The enhanced circuit breaker contains sensors, control circuitry, and a main switch and a load switch that are actuator-operated and wired in series on the hot wire between the line and the load. The main switch may be tripped by the actuator to open, while a manual intervention is required to close. The load switch may be electronically opened and closed by operation of the actuator. Sensors within the enhanced circuit breaker may be used to detect fault conditions, as well as gathering data that may be used for predicting failures. Data from the sensors from one or more breakers may be used to determine state of the system, predict failures, and so forth. The breaker operates the load switch responsive to an external command.

20 Claims, 7 Drawing Sheets

SYSTEM FOR OPERATION OF ENHANCED CIRCUIT BREAKERS

BACKGROUND

Electrical faults in homes and businesses cause damage to property and have the potential for loss of life. Uncontrolled electrical loads may result in power demand that exceeds supply at a given time.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
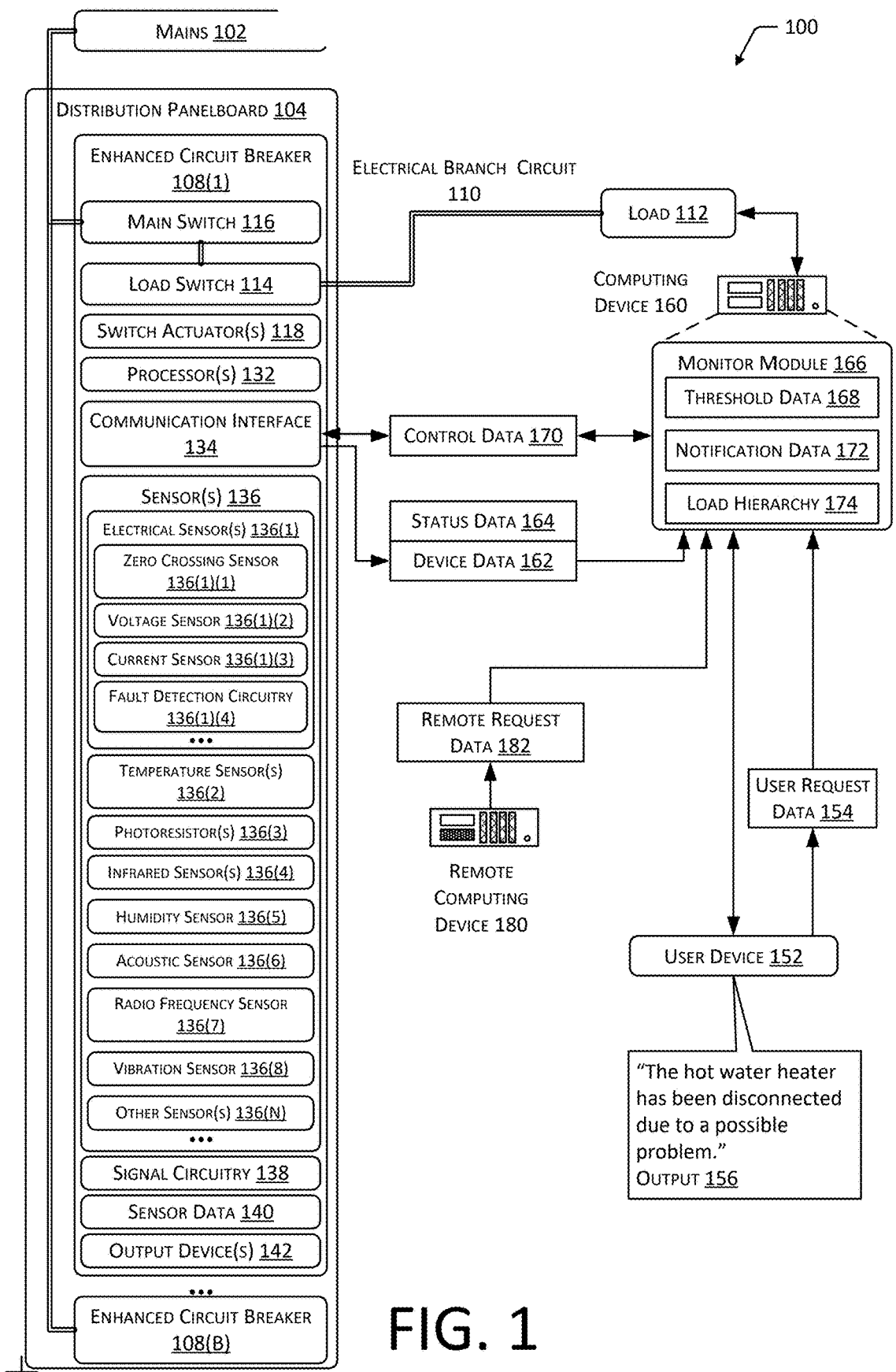
FIG. 1 illustrates a system comprising an enhanced circuit breaker, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Electric power, such as alternating current (AC) electrical power, provides a convenient and effective way to distribute and harness energy. AC changes from a positive to a negative voltage over a specific period of time. For example, in the United States AC power is provided as a sine wave with a frequency of 60 Hertz. AC electrical power is distributed via electrical mains into distribution panelboards found in homes, businesses, and so forth. The distribution panelboard, sometimes known as a "main panel" or "breaker panel", has a busbar that is connected to the electrical mains. For example, the busbar may be connected to the "line" or "hot" leg of one AC phase. Connected to the busbar via devices such as circuit breakers are branch circuits, and one or more loads may be connected to each branch circuit. For example, loads may include an electric vehicle charger, hot water heater, air conditioner, and so forth. Other loads may also include lights or may be connected via electrical receptacles. For example, a portable vacuum cleaner plugged into an electrical receptacle is a load on the branch circuit to which the electrical receptacle is connected.

To avoid dangerous or potentially dangerous situations, a variety of protective mechanisms have been attempted. Current limiting devices such as fuses or circuit breakers installed at the distribution panelboard determine if transfer of electrical current to a branch circuit is greater than some threshold. If so, when operating properly the circuit breaker electrically disconnects the branch circuit from the busbar. For example, a current-limiting circuit breaker may "trip", actuating a trip mechanism that operates a main switch to disconnect the branch circuit and any connected loads from the busbar. Once tripped, manual user input may be required to reset the trip mechanism and close the main switch. However, sometimes the trip mechanism may fail to operate, resulting in the branch circuit remaining energized. This can result in an unsafe condition continuing and endanger occupants and the structure.

Other types of protective devices attempt to determine other types of faults. These faults may also actuate the trip mechanism to open the main switch and attempt to deenergize the branch circuit. A ground fault circuit interrupter (GFCI) attempts to determine if there is a current imbalance between conductors in the circuit that may be associated with an unwanted path to electrical ground. If this type of fault is detected, the GFCI disconnects the branch circuit and associated load from the busbar. For example, GFCIs are commonly used for loads that are near water, where a potential failure could result in electrocution of a person. An arc fault circuit interrupter (AFCI) attempts to determine if an electrical arc has been detected on the branch circuit. For example, an AFCI may monitor the voltage and current delivered to the branch circuit to determine if an electrical arc is present.

Electrical wiring as installed presents many opportunities for potential failure. For example, much electrical wiring is installed with little or no oversight. Once installed, electrical wiring is difficult to inspect, and often is never inspected until after a failure occurs. Even with correct installation, over time electrical connections may become loose, contaminants may be introduced, insulation degrades over time, and so forth. For example, screw terminals may loosen over time, producing a gap between a wire and the terminal. Arcing may occur in these gaps.

Conventional circuit breakers as mentioned above attempt to limit the damage due to a catastrophic failure by having circuit breakers with a single main switch that is opened. However, in some circumstances the main switch may fail to open, leaving the branch circuit energized.

While the trip mechanism in a conventional circuit breaker may be manually operated to open and close the main switch to control power to the branch circuit, it is ill suited for such operation. Use in this fashion increases the wear and tear on the trip mechanism and switch components, which may result in premature failure. Manual operation requires the user physically go to the distribution panelboard and operate the trip mechanism as desired.

Described in this disclosure is an enhanced circuit breaker that offers improved safety and control over an attached load on a branch circuit. One or more of these enhanced circuit breakers may be installed at a distribution panelboard to provide enhanced functionality.

The enhanced circuit breaker contains sensors, control circuitry, and a main switch and a load switch that are actuator-operated and wired in series on a hot wire between the line and the load. The main switch may be tripped by the actuator to open, while a manual intervention is required to close. The load switch may be electronically opened and closed by operation of the actuator. Sensors within the enhanced circuit breaker may be used to detect fault conditions, as well as gathering data that may be used for predicting failures. Data from the sensors from one or more breakers may be used to determine state of the system, predict failures, and so forth. In the event of a fault condition, at a first time the main switch may be opened by actuating the trip mechanism. Following this, at a second time the load switch may be opened as well, providing an additional opportunity for the load to be disconnected from the line. For example, if the trip mechanism fails to operate and remains closed, the opening of the load switch will still disconnect the load from the line.

The load switch may be used in other situations. In one implementation, the load switch may be opened if the electrical current through the enhanced circuit breaker (as measured by a sensor) is greater than a threshold value. This allows the enhanced circuit breaker to be set to disconnect the load at a specified current value, but before an overcurrent limit is reached. This enhances safety and control by allowing circuit-breaker individually configurable current limits to be specified. The load switch may then be closed at a later time, such as after a threshold period of time, upon receiving a command to do so, and so forth.

The load switch may be operated to connect or disconnect an electrical load. In one implementation this may be done to better match overall electrical load to overall electrical supply. For example, the enhanced circuit breaker may open the load switch responsive to data from an onsite battery bank controller, onsite photovoltaic array controller, electrical utility, and so forth that indicates electrical demand is exceeding available supply.

The load switch may also be operated to control an electrical load for other reasons. For example, the enhanced circuit breaker may be used to control power to exterior lights, a hot water heater, or other load. The load switch may be operated to provide power at specified times of day, responsive to user commands, and so forth.

The sensors of the enhanced circuit breaker may be used to acquire sensor data associated with operation of the enhanced circuit breaker. For example, the sensor data may comprise electrical current supplied to the load, temperature of one or more parts of the enhanced circuit breaker or the surrounding environment, and so forth. In some implementations the sensor data may be used to predict potential faults. For example, an increase in temperature measured at a load terminal may be indicative of increased electrical resistance due to a load terminal screw being loose.

The enhanced circuit breaker may communicate with other devices using wired or wireless communication interfaces. For example, the enhanced circuit breaker may use powerline communications techniques or WiFi to communicate with a computing device. The computing device may be in communication with other devices. For example, an enhanced circuit breaker determines a fault has occurred and trips the main switch. The enhanced circuit breaker may send status data indicative of this fault to the computing device. Based on this, the computing device may then send a notification to a user device. For example, the user device may comprise a tablet computer, cellphone, internet enabled speaker, and so forth. The notification may then be presented via the user device. For example, the internet enabled speaker may announce "the circuit breaker supplying the hot water tank with power has tripped."

In the event of a predicted failure, such as based on one or more values of sensor data exceeding a threshold, the enhanced circuit breaker may remain in operation while a request for service is sent. For example, the enhanced circuit breaker may send data to an associated device, such as a monitor module. The monitor module may then generate and send output data to a user device that is indicative of a potential failure. Upon receipt of the user's input approving a service request, the monitor module may send a service request to another system. Responsive to the service request, a service technician may review and take necessary actions to remedy the incipient failure.

By using the systems and techniques described in this disclosure, electrical distribution system failures may be predicted or detected and mitigated quickly and expeditiously, potentially before catastrophic failure. The load switch may be operated to provide redundancy to a main switch, to control the load, and so forth. As a result, overall safety and utility of the electrical distribution system is improved.

Illustrative System

FIG. 1 illustrates a system 100 comprising an enhanced circuit breaker and its operation, according to some implementations. Electrical power comprising one or more phases of alternating current (AC) is provided via electrical mains ("mains") 102 to a distribution panelboard 104. The distribution panelboard 104 may comprise one or more busbars. Each busbar may be connected to one line or phase of the mains 102. The distribution panelboard 104 may comprise one or more circuit breakers (not shown) or enhanced circuit breakers 108(1), 108(2), . . . , 108(B).

The enhanced circuit breakers 108 may comprise two terminals, including a first terminal (or "line terminal" or "busbar terminal") that electrically connects to a busbar and a second terminal (or "branch circuit terminal" or "load terminal"). The enhanced circuit breakers 108 comprise a load switch 114 and a main switch 116 on the hot line, and in some implementations on other lines as well associated with an electrical branch circuit 110. The load switch 114 and the main switch 116 are connected in series. Different arrangements of the load switch 114 with respect to the main switch 116 may be used. For example, in this illustration the main switch 116 is proximate to the mains 102, while in other implementations the load switch 114 may be proximate to the mains 102.

An electrical branch circuit 110 is connected to the second terminal or "load" terminal of the enhanced circuit breaker 108. A load 112 is connected to the electrical branch circuit 110. These loads 112 may comprise one or more devices, appliances, and so forth. For example, the load 112 may comprise an electric vehicle charger, a hot water heater, lights, and so forth. If either of the load switch 114 or the main switch 116 are opened, the electrical branch circuit 110 will be disconnected from the line, and thus no longer be energized by the mains 102.

The load switch 114 and the main switch 116 are actuated by one or more switch actuators 118. For example, the switch actuator 118 may comprise a three-position solenoid that may be operated to open and close the load switch 114, open the main switch 116, and so forth. In other implementations, the switch actuator 118 may comprise other mechanisms. For example, the switch actuator 118 may comprise a first actuator, a second actuator, and so forth.

The load switch 114 may comprise a pair of electrical contacts. In one implementation, the pair of contacts may be biased to remain in contact, closing the load switch 114. The operation of the switch actuator 118 to move to one position may separate the pair of contacts, opening the load switch 114. The switch actuator 118 may then move to a second position that allows the pair of contacts to come into contact, closing the load switch 114. In another implementation, a first switch actuator 118(1) may operate the load switch 114, a second switch actuator 118(2) may operate the main switch 116, and so forth.

The main switch 116 may operate as a protective relay. The main switch 116 may comprise devices such as a flux collector and a trip mechanism. When actuated, or "tripped", the trip mechanism may open the main switch 116, disconnecting the load terminal from the line terminal. In some implementations, the main switch 116 may be able to transition from closed to open responsive to operation of the switch actuator 118. In contrast, manual intervention may be required to restore the main switch 116 to a closed state.

The enhanced circuit breaker 108 may have other terminals with corresponding connections to a neutral, electrical ground, and so forth. In some implementations, one or more of these terminals may be switched by one or more of the load switch 114 or the main switch 116.

The enhanced circuit breaker 108 may comprise one or more processors 132, communication interfaces 134, sensors 136, signal circuitry 138, output devices 142, and so forth. The enhanced circuit breaker 108 is discussed in more detail in the following figures. In brief, the processors 132 may use the sensors 136 to acquire sensor data 140. The sensors 136 may be used to acquire information about the operation of the enhanced circuit breaker 108. The sensors 136 may include one or more of electrical sensors 136(1), temperature sensors 136(2), photoresistors 136(3), infrared sensors 136(4), humidity sensors 136(5), acoustic sensors 136(6), radio frequency sensors 136(7), vibration sensors 136(8), or other sensors 136(N).

The enhanced circuit breaker 108 may comprise one or more communication interfaces 134. For example, the communication interfaces 134 may include devices compatible with Ethernet, Wifi, Bluetooth, the IEEE 1901 standard, X10, and so forth. The communication interfaces 134 are discussed in more detail below with regard to FIG. 3.

The electrical sensors 136(1) may comprise one or more of a zero crossing sensor 136(1)(1), voltage sensor 136(1)(2), current sensor 136(1)(3), fault detection circuitry 136(1)(4), and so forth. The zero crossing sensor 136(1)(1) may comprise circuitry that determines when the voltage of the alternating current passes through 0 volts. For example, AC electrical power in the United States may comprise a sine wave with a frequency of 60 Hertz (Hz), resulting in two zero crossings per cycle. In some implementations, output from the zero crossing sensor 136(1)(1) may be used to coordinate operation of the load switch 114 or other components. For example, the load switch 114 may be operated to open or close at times associated with a zero crossing. By coordinating this operation to the zero crossing of the power from the mains 102, the longevity of the load switch 114 is substantially increased. For example, a load switch 114 having mechanically moved contacts will experience little or no erosion due to arcing if operated at or near the time of zero crossing due to the reduced voltage present across the contacts at this time.

The voltage sensor 136(1)(2) may comprise circuitry to determine a voltage or voltage drop between two points in an electrical circuit. The current sensor 136(1)(3) may comprise circuitry to determine amperage through a portion of the electrical circuit. For example, the current sensor 136(1)(3) may comprise a Hall effect sensor located proximate to the hot line. The fault detection circuitry 136(1)(4) may comprise circuitry to determine other faults, such as ground fault interrupt circuitry, arc fault circuit interrupt circuitry, short circuit detection circuitry, and so forth. The electrical sensors 136(1) may include other sensors that are not shown, such as circuitry to detect miswiring of the electrical branch circuit 110 or attached load(s) 112, ohmmeter circuitry, and so forth.

In some implementations the electrical sensors 136(1) may comprise a frequency counter to determine a line frequency of the mains 102. In some implementations, operation of the system 100 may be based at least in part on the line frequency. For example, in the event of a low frequency event, the monitor module 166 may operate an enhanced circuit breaker 108 to de-energize a load 112.

A temperature sensor 136(2) provides data indicative of the temperature of a portion of the enhanced circuit breaker 108 or the ambient environment. The temperature sensors 136(2) may comprise thermistors, thermocouples, silicon bandgap temperature sensors, and so forth.

A photoresistor 136(3) may acquire sensor data 140 indicative of a flash of light generated by an electrical arc. The photoresistor 136(3) may be located within the body of the enhanced circuit breaker 108 proximate to one or more of the load switch 114, the main switch 116, the line terminal, the load terminal, and so on. For example, a photoresistor 136(3) that is proximate to the load terminal may detect an arc flash resulting from a loose load terminal screw.

In some implementations, photoresistors 136(3), photodetectors, or other photosensitive devices may be used that are responsive to different wavelengths. These wavelengths may include, but are not limited to, infrared, visible, or ultraviolet light. The photoresistors 136(3) may be operated in conjunction with optical filters. For example, an optical bandpass filter may be used to limit the wavelengths of light impinging upon the active portion of the photoresistors 136(3).

An infrared sensor 136(4) may comprise passive infrared sensors that are responsive to different wavelengths. These wavelengths may include, but are not limited to far infrared, mid infrared, or near infrared. The infrared sensors 136(4) may be operated in conjunction with optical filters. For example, an optical bandpass filter may be used to limit the wavelengths of light impinging upon the active portion of the infrared sensor 136(4).

The sensors 136 may include one or more humidity sensors 136(5). The humidity sensors 136(5) may be configured to determine ambient relative humidity. For example, the humidity sensors 136(5) may comprise capacitive, resistive, optical, or other elements.

The sensors 136 may include one or more acoustic sensors 136(6). For example, the acoustic sensors 136(6) may comprise one or more microphones.

The sensors 136 may include one or more radio frequency (RF) sensors 136(7). For example, the RF sensors 136(7) may comprise a high frequency radio receiver that acquires radio frequency data. For example, the radio frequency data may comprise samples indicative of signal amplitudes at a plurality of frequencies, across a specified frequency range, and so forth. Arcing may result in RF noise or signals that are detectable by the RF sensors 136(7). In some implementations, one or more portions of the communication interfaces 134 may be used as the RF sensor 136(7). For example, a receiver of a WiFi radio or a powerline communication device may be used to acquire the radio frequency data.

The sensors 136 may include one or more vibration sensors 136(8). The vibration sensors 136(8) may comprise microelectromechanical devices, gyrometers, accelerometers, and so forth. The vibration sensors 136(8) may provide as output vibration data. The vibration data may be indicative of mechanical or physical movement. For example, during operation of the trip mechanism of the main switch 116, the mechanical motion of the trip mechanism may be detected by the vibration sensor 136(8) to confirm operation of the main switch 116. In some situations the vibration data acquired by the vibration sensors 136(8) may be used to determine a physical event that may be associated with an unsafe condition that may result in de-energizing the load terminal. For example, the mechanical vibration resulting from structural collapse or geologic motion such as an earthquakes may be detected, determined to be a fault condition, and result in opening of one or more of the load switch 114 or the main switch 116.

The sensors 136 may include, or have one or more of the other sensors 136(N) operate as, a smoke detector. For example, the sensors 136 may include a photoelectric smoke detector, ionization smoke detector, and so forth. In another example, the other sensors 136(N) sensors may include one or more chemical sensors. The chemical sensors may comprise circuitry and devices to detect the presence of one or more chemical compounds. In some implementations the chemical sensors may provide information indicative of concentration. The chemical sensors may detect compounds such as one or more of ozone, radon, carbon monoxide, carbon dioxide, hydrocarbons such as natural gas, and so forth. For example, the chemical sensors may detect products created during combustion, decomposition, and so forth.

The sensors 136 may be connected to the signal circuitry 138. The signal circuitry 138 may comprise one or more multiplexers. At a specified time, the multiplexer may connect a particular sensor 136 to gain circuitry. The gain circuitry may comprise an operational amplifier ("op amp"). Output from the gain circuitry may be passed to a signal filter. For example, the signal filter may comprise one or more resistors or capacitors.

Output from the signal filter is provided to an analog to digital (ADC) driver. The ADC driver may comprise an amplifier and circuitry to perform various functions such as buffering, amplitude scaling, offset adjustments, and so forth. Output from the ADC driver may be passed to an ADC filter. The ADC filter may comprise one or more resistors or capacitors. Output from the ADC filter may be passed to an ADC.

The ADC provides as output the sensor data 140 comprising digital information indicative of the phenomena detected by the sensor 136.

The signal circuitry 138 may be operated to acquire sensor data 140 at a specified data acquisition frequency. Different sensors 136 may be operated at different data acquisition frequencies. For example, the signal circuitry 138 may operate the electrical sensor(s) 136(1) to operate and collect 22,000 samples per second while the temperature sensors 136(2), photoresistors 136(3), infrared sensors 136(4), humidity sensor 136(5), and so forth are operated to acquire 5,000 samples per second of sensor data 140. The bit-depth of the respective sensor data 140 acquired may vary between sensors 136. For example, the signal circuitry 138 may acquire sensor data 140 using the temperature sensor 136(2) with a bit-depth of 8 bits, while the sensor data 140 acquired using the electrical sensors 136(1) have bit-depths of 16 bits.

In other implementations other signal circuitry 138 configurations may be used.

The sensor data 140 is processed to determine device data 162 such as a peak current measured for a specified period of time, temperature of one or more portions of the enhanced circuit breaker 108, and so forth. The device data 162 may be processed to determine status data 164. For example, the device data 162 may be compared to one or more threshold values to determine status data 164 indicative of a status, such as "non-fault", "warning fault", "critical fault" and so forth. Based on the device data 162, one or more output devices 142 such as a light or buzzer may be operated to annunciate the status. The communication interface 134 may be used to send one or more of the device data 162 or the status data 164 to another device, such as a computing device 160.

The computing device 160 is in communication with the enhanced circuit breakers 108(1)-(B) and may be in communication with other devices. For example, the computing device 160 may be in communication with network-enabled loads such as electric vehicle chargers, rechargeable battery banks, and so forth. Communication may be supported by a local area network. This may be a wired or wireless local area network. For example, a wireless access point may be used to facilitate communication between the computing device 160 and a user device 152, and so forth.

The computing device 160 may be a standalone device as shown here. In other implementations, the computing device 160 may be installed at the distribution panelboard 104. In still other implementations, the computing device 160 may be a shared computing device, such as a server that is either local or accessed via a wide area network, such as the Internet.

The computing device 160 may execute a monitor module 166. Operation of the monitor module 166 is discussed in more detail below. In brief, the monitor module 166 may accept as input one or more of the device data 162, the status data 164, user request data 154 from the user device 152, or other data. For example, the enhanced circuit breaker 108 may send device data 162, and the monitor module 166 may determine the status data 164 based at least in part on a comparison between the status data 164 and threshold data 168. In another example, the enhanced circuit breaker 108 may determine the status data 164 and send the status data 164 to the monitor module 166.

The monitor module 166 may use the status data 164 to determine one or more of control data 170 or notification data 172. In some implementations the monitor module 166 may determine one or more of the control data 170 or the notification data 172 based on the remote request data 182.

The control data 170 may comprise instructions or other information that directs operation of the enhanced circuit breaker 108. For example, the control data 170 may comprise instructions sent to an enhanced circuit breaker 108 that directs the switch actuator(s) 118 to operate one or more of the load switch 114 or the main switch 116. In another example, the control data 170 may comprise instructions to operate the signal circuitry 138, the one or more output devices 142, and so forth.

In some implementations, the user device 152 may send user request data 154 to the monitor module 166 that comprises instructions to open or close the load switch 114 of a particular enhanced circuit breaker 108. Responsive to this, the monitor module 166 may then send control data 170 to the particular enhanced circuit breaker 108.

In some implementations the computing device 160 may be in communication with the load 112. For example, the load 112 may include a communication interface. The load 112 may send the monitor module 166 information indicative of operation, such as current operating mode, power requirements, and so forth. In some implementations the load 112 may operate responsive to control data 170 provided by the monitor module 166. For example, the monitor module 166 may send control data 170 to direct the load 112 to switch to a different operating mode, discontinue operation, and so forth.

The computing device 160 may also be in communication with a remote computing device 180. For example, a virtual power plant (VPP), electric utility company, or other entity may operate the remote computing device 180 to provide electrical grid stabilization services through the coordination of loads facilitated by the enhanced circuit breaker 108. For example, in the event that electricity production is less than electrical demand, the remote computing device 180 may send remote request data 182 to the computing device 160 requesting a reduction in overall demand. Responsive to this, the computing device 160 may operate one or more enhanced circuit breakers 108 to open the load switch 114 and de-energize a load 112, reducing electrical demand. The remote computing device 180 may send the computing device 160 remote request data 182 that indicates normal operation may resume. Responsive to this, the computing device 160 may operate the one or more enhanced circuit breakers 108 to close the load switch 114 and energize the load 112. In some implementations, the computing device 160 may implement hierarchical load management, as discussed in more detail below.

In some implementations the monitor module 166 may utilize data that specifies a load hierarchy 174. The load hierarchy 174 may specify particular enhanced circuit breakers 108, may characterize the type of load 112 they are servicing, and one or more parameters associated with when that load 112 may be de-energized. For example, the load hierarchy 174 may specify that enhanced circuit breaker 108(17) provides power to a domestic hot water tank that may be de-energized between the hours of 9 am and 4 μm. The load hierarchy 174 may specify an ordering of which loads 112 to de-energize to meet a specified reduction. For example, the load hierarchy 174 may specify that the hot water tank is to be de-energized first, followed by the electric vehicle charger, followed by the air conditioning unit, and so forth. In the event that the monitor module 166 determines that it is exceeding a threshold maximum amount of power consumption, or responsive to the remote request data 182, the monitor module 166 may operate the load switches 114 of the respective enhanced circuit breakers 108 to de-energize the loads 112 in the specified order of the load hierarchy 174.

As mentioned above, in some implementations the electrical sensors 136(1) may comprise a frequency counter to determine a line frequency of the mains 102. In some implementations, operation of the system 100 may be based at least in part on the line frequency. For example, the monitor module 166 may operate one or more enhanced circuit breakers 108 to connect or disconnect loads 112 responsive to the line frequency.

The monitor module 166 may determine notification data 172. The notification data 172 may comprise information indicative of status of at least a portion of the system 100. The notification data 172 may be used to present output 156. For example, the notification data 172 may indicate that enhanced circuit breaker 108(1) labeled "hot water heater" has been disconnected. The notification data 172 may be used to present a user interface that conveys this information. For example, the notification data 172 may comprise instructions to operate a network enabled speaker to provide audio output 156 such as synthesized speech announcing, "the hot water heater has been disconnected due to a possible problem". The enhanced circuit breaker 108 may also use an output device 142 to provide output 156, such as illuminating a light, operating a buzzer, and so forth.

In some implementations, the output 156 may be used to summon service of the system or a portion thereof. For example, the monitor module 166 may analyze device data 162 from an enhanced circuit breaker 108 that is associated with a dedicated load 112. Continuing the example, the device data 162 may be analyzed to determine status data 164 indicative of a change in one or more characteristics that exceed a threshold, such as a peak current draw that is greater than previous peak current draw, temperature that exceeds a threshold value, and so forth. Based on the status data 164, the output 156 may be provided to the user device 152, sent to a service dispatch system, and so forth. Continuing the example, the user device 152 may present output 156 that indicates "Did you want to schedule a service call to check on the hot water heater?". Responsive to the user's input indicative of approval, data may be sent to a service dispatch system to schedule a service technician. In some implementations, the service dispatch system may be provided with information such as the identifier of the enhanced service breaker 108, information about the attached load 112, information about the failure, and so forth.

For ease of illustration, and not necessarily as a limitation, the system 100 is described with regard to each enhanced circuit breaker 108 servicing a single-phase electrical branch circuit 110. In other implementations, the enhanced circuit breaker 108 may operate with regard to one or more electrical phases. For example, the enhanced circuit breaker 108 may service two or more phases.

Figure 2:
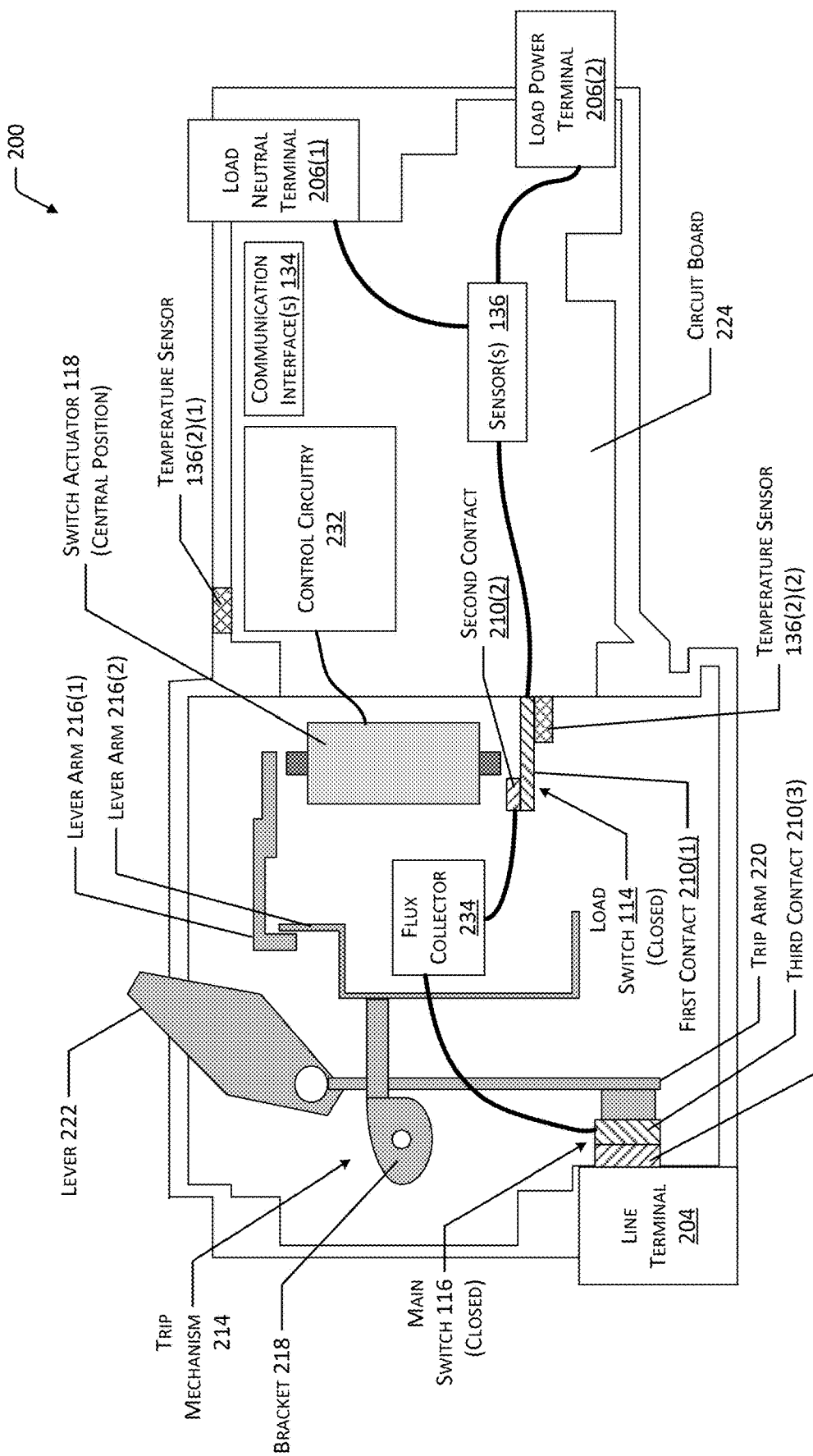
FIG. 2 is a diagram depicting an implementation of an enhanced circuit breaker according to some implementations.

FIG. 2 is a diagram 200 depicting an implementation of an enhanced circuit breaker 108 having a switch actuator 118 that controls operation of switches within the device. In one implementation, the switch actuator 118 may comprise a three-position solenoid. In this illustration, the switch actuator 118 is depicted as a three-position solenoid with an armature in a central position that does not transition the switches from closed to open positions. The device may include a line terminal 204 that receives electrical power from a power source, such as AC electrical mains 102. The device may also include one or more load terminals 206, which may connect to a load 112 to enable electrical power to flow from the line terminal 204, through the enhanced circuit breaker 108, to the load terminal 206, to energize the load 112. For example, a load terminal 206 may be coupled to an electrical outlet that is coupled to an appliance or other type of electrical device. FIG. 2 depicts the enhanced circuit breaker 108 including a load neutral terminal 206(1) and a load power terminal 206(2). In some implementations, the hot or power line that is connected to the load power terminal 206(2) may be switched while the load neutral terminal 206(1) is not switched.

The enhanced circuit breaker 108 may include two or more switches connected in series between the line terminal 204 and load power terminal 206(2). For example, FIG. 2 depicts a load switch 114 that includes a first contact 210(1)

and a second contact 210(2). The first contact 210(1) is connected to the load terminal(s) 206, while the second contact 210(2) is connected to a main switch 116 that is in turn connected to the line terminal 204. When the load switch 114 is in a closed position that permits electrical power to flow from the line terminal 204 to the load power terminal 206(2), the first contact 210(1) and the second contact 210(2) are in contact with one another. To prevent the flow of electrical power and electrically disconnect the load power terminal 206(2) from the line terminal 204, the load switch 114 may be opened by moving at least one of the first contact 210(1) or the second contact 210(2) away from the other of the first contact 210(1) or second contact 210(2). For example, the first contact 210(1) may be movable relative to the second contact 210(2) (e.g., away from the second contact 210(2)) to open the load switch 114. In other implementations, the second contact 210(2) may be movable relative to the first contact 210(1). In still other implementations, both the first contact 210(1) and the second contact 210(2) may be movable. The load switch 114 may be biased toward the closed position. For example, a spring or other biasing member may be used to apply a force that moves the first contact 210(1) toward the second contact 210(2) in the absence of other forces applied to the first contact 210(1). The switch actuator 118 may be used to apply a force to the first contact 210(1) to open the load switch 114.

FIG. 2 also depicts a main switch 116 connected in series with the line terminal 204, the load switch 114, and the load power terminal 206(2). For example, the main switch 116 may comprise a protective relay. The main switch 116 includes a third contact 210(3) connected to the second contact 210(2) of the load switch 114, and a fourth contact 210(4) connected to the line terminal 204. When the main switch 116 is in a closed position that permits electrical power to flow from the line terminal 204 to the load power terminal 206(2), the third contact 210(3) and the fourth contact 210(4) are in contact with one another. To prevent the flow of electrical power and electrically disconnect the load power terminal 206(2) from the line terminal 204, the main switch 116 may be opened by moving at least one of the third contact 210(3) or the fourth contact 210(4) away from the other of the third contact 210(3) or fourth contact 210(4). For example, FIG. 2 depicts the third contact 210(3) associated with a trip mechanism 214. The trip mechanism 214 may be movable between a closed state, as shown in FIG. 2, in which the main switch 116 is in a closed position, to an open state in which the main switch 116 is in an open position. For example, in response to detection of a ground fault, arc fault, short circuit, overcurrent, or other selected characteristic of current within the device, the enhanced circuit breaker 108 may be configured to transition the trip mechanism 214 from the closed state to the open state to electrically disconnect the load power terminal 206(2) from the line terminal 204. As one example implementation of a trip mechanism 214, FIG. 2 depicts a first lever arm 216(1) positioned proximate to the switch actuator 118, a second lever arm 216(2) that engages the first lever arm 216(1), and a bracket 218 that engages the second lever arm 216(2). The bracket 218 in turn engages a trip arm 220, which is connected to the third contact 210(3) and a lever 222. The switch actuator 118 may be used to apply a force to the trip mechanism 214 via the lever arm(s) 216 to transition the trip mechanism 214 from the closed state to the open state. In some implementations, after the trip mechanism 214 has been placed in the open state, the lever 222 may be used to return the trip mechanism 214 to the closed state, such as through application of an external force by a human operator. While FIG. 2 depicts one example of a trip mechanism 214 that includes lever arms 216, a bracket 218, a trip arm 220, and a lever 222, any type of mechanical mechanism configured to separate the third contact 210(3) from the fourth contact 210(4) in response to application of a force by the switch actuator 118 may be used.

A circuit board 224 within the enhanced circuit breaker 108 may include various components such as described with regard to FIG. 1. For example, the circuit board 224 may comprise the one or more processors 132, communication interface(s) 134, sensors 136, and so forth.

One or more of the sensors 136 may be located at different portions of the enhanced circuit breaker 108. In this illustration, a first temperature sensor 136(2)(1) is located proximate to an outer (that is, away from busbar connections) edge of the housing of the enhanced circuit breaker 108. The first temperature sensor 136(2)(1) may be used to acquire temperature data about the ambient environment. A second temperature sensor 136(2)(2) is located proximate to the load switch 114 to acquire temperature data about the load switch 114 or a portion thereof. For example, the second temperature sensor 136(2)(2) may acquire temperature data indicative of a temperature of the first contact 210(1).

The electrical sensors 136(1) may be coupled to, or physically proximate to at least a portion of, the electrical wiring carrying the AC power between the line terminal 204 and the load terminals 206.

In some cases, communication interfaces 134 may receive signals or commands from components of the enhanced circuit breaker 108 itself. Control circuitry 232 may be used to control movement of the switch actuator 118, such as in response to commands received using the communication interface(s) 134, or signals from the one or more sensors 136. For example, the switch actuator 118 may be caused to transition the trip mechanism 214 to the open state if a signal from the fault detection circuitry 136(1)(4) indicative of a fault is received. As another example, the switch actuator 118 may be caused to open the load switch 114 if control data 170 comprising a command to electrically disconnect the load power terminal 206(2) from the line terminal 204 is received. In implementations in which the switch actuator 118 comprises a solenoid, the switch actuator 118 may be used to manipulate the load switch 114 and the main switch 116 (via the trip mechanism 214) by providing current to electrical coils within the switch actuator 118 to cause an armature thereof to move. The circuit board 224 may also include various other components such as varistors (e.g., metal oxide varistors), capacitors, fuses, inductors, and so forth.

Figure 3:
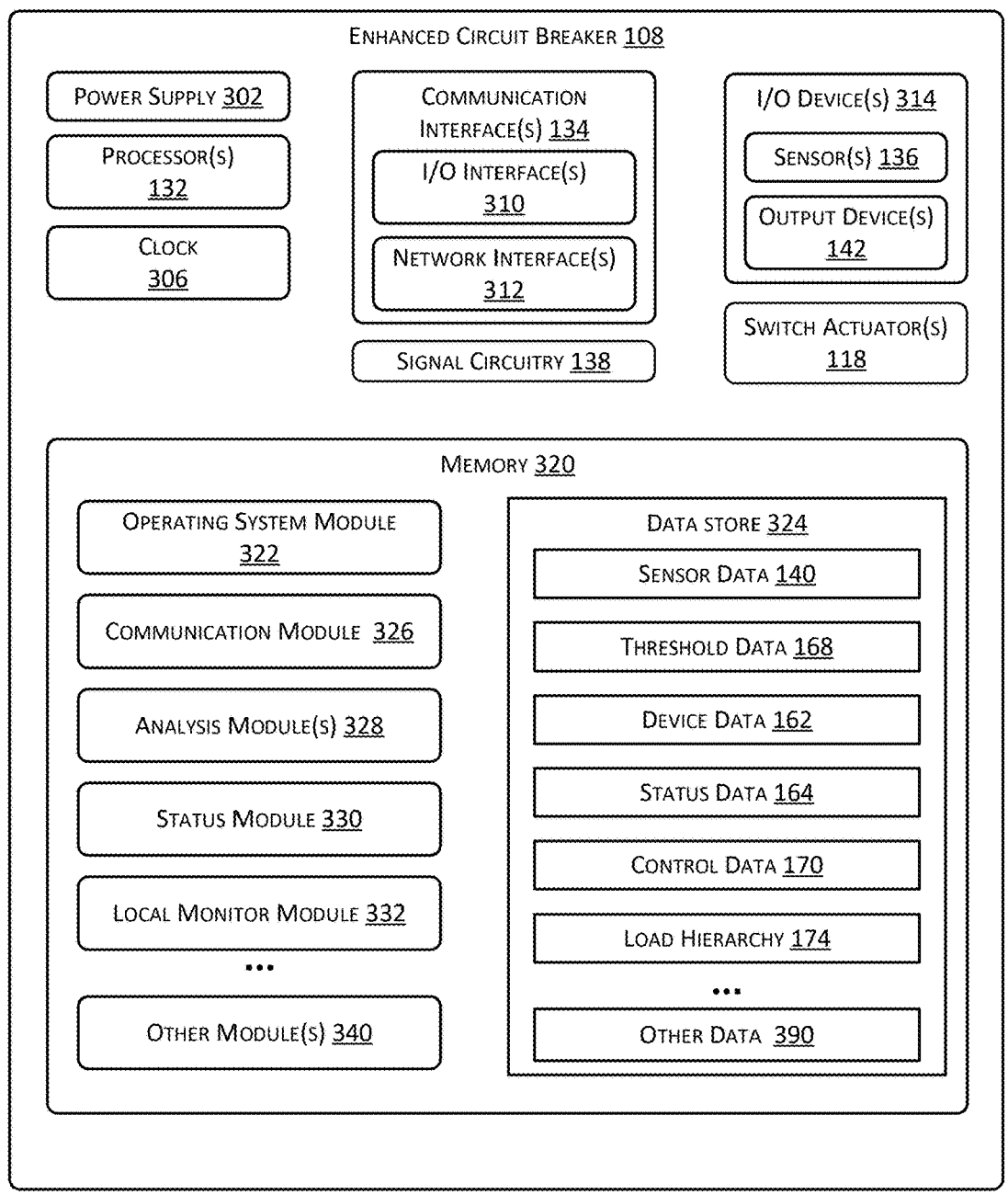
FIG. 3 is a block diagram of an enhanced circuit breaker, according to some implementations.

FIG. 3 is a block diagram 300 of an enhanced circuit breaker 108, according to some implementations. The enhanced circuit breaker 108 may be implemented as one or more of an embedded system, utilize a system on a chip, discrete circuitry, and so forth.

One or more power supplies 302 may be configured to provide electrical power suitable for operating the components in the enhanced circuit breaker 108. The one or more power supplies 302 may comprise capacitors, batteries, connections to the mains 102, and so forth. In some implementations, the power supply 302 may be configured to provide electrical power to the enhanced circuit breaker 108 after the mains 102 are no longer energized. For example, the power supply 302 may include capacitors to provide electrical power for the enhanced circuit breaker 108 to send one or more of device data 162, status data 164, or another message or signal to another device.

The enhanced circuit breaker 108 may include one or more hardware processors 132 (processors) configured to execute one or more stored instructions. For example, the hardware processors 132 may include application specific integrated circuits (ASICs), field-programmable gate arrays (FPGAs), digital signal processors (DSPs), and so forth. The processors 132 may comprise one or more cores. One or more clocks 306 may provide information indicative of date, time, ticks, and so forth.

The enhanced circuit breaker 108 may include one or more communication interfaces 134 such as input/output (I/O) interfaces 310, network interfaces 312, and so forth. The communication interfaces 134 enable the enhanced circuit breaker 108, or components thereof, to communicate with other devices or components. The communication interfaces 134 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), and so forth.

The I/O interface(s) 310 may couple to one or more I/O devices 314. The I/O devices 314 may include input devices such as one or more of a sensor 136, button, and so forth. Operation of the one or more sensors 136 may utilize the signal circuitry 138 as discussed above. The I/O devices 314 may also include output devices 142 such as one or more of a light, display device, buzzer, audio speakers, and so forth. In some embodiments, the I/O devices 314 may be physically incorporated with the enhanced circuit breaker 108 or may be externally placed.

The enhanced circuit breaker 108 may also comprise one or more switch actuators 118 and associated circuitry. For example, the switch actuator 118 may comprise a three-position solenoid and associated control circuitry 232. The control circuitry 232 may be connected to an I/O interface 310, such that a command sent via the I/O interface 310 operates the switch actuator 118.

The network interfaces 312 may be configured to provide communications between the enhanced circuit breaker 108 and other devices, such as routers, wireless access points, and so forth. The network interfaces 312 may include devices configured to couple to personal area networks (PANs), local area networks (LANs), powerline communication networks (PCNs), wireless local area networks (WLANS), wide area networks (WANs), and so forth. For example, the network interfaces 312 may include devices compatible with Ethernet, WiFi, Bluetooth, the IEEE 1901 standard, X10, and so forth.

The enhanced circuit breaker 108 may also include one or more buses or other internal communications hardware or software that allow for the transfer of data between the various modules and components of the enhanced circuit breaker 108.

As shown in FIG. 3, the enhanced circuit breaker 108 includes one or more memories 320. The memory 320 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 320 provides storage of computer-readable instructions, data structures, program modules, and other data for the operation of the enhanced circuit breaker 108. Some functional modules are shown stored in the memory 320, although the same functionality may alternatively be implemented in hardware, firmware, as a system on a chip (SoC), dedicated circuitry, and so forth.

The memory 320 may include at least one operating system (OS) module 322. The OS module 322 is configured to manage hardware resource devices such as the I/O interfaces 310, the I/O devices 314, the communication interfaces 134, and provide various services to applications or modules executing on the processors 132. The OS module 322 may implement a variant of the FreeBSD operating system as promulgated by the FreeBSD Project; other UNIX or UNIX-like variants; a variation of the Linux operating system as promulgated by Linus Torvalds; FreeRTOS; Zephyr; VxWorks; and so forth.

Also stored in the memory 320 may be a data store 324 and one or more of the following modules. For example, these modules may be executed as foreground applications, background tasks, daemons, and so forth. The data store 324 may use a flat file, database, linked list, tree, executable code, script, or other data structure to store information. In some implementations, the data store 324 or a portion of the data store 324 may be distributed across one or more other devices including the computing device 160, network attached storage devices, and so forth.

The data store 324 may store one or more of sensor data 140, threshold data 168, device data 162, status data 164, control data 170, load hierarchy 174, or other data 390. The sensor data 140 may be acquired using one or more of the sensors 136 or other devices. For example, in some implementations the network interfaces 312 may be used to acquire sensor data 140.

A communication module 326 may be configured to establish communications with other devices, such as other enhanced circuit breakers 108, the computing device 160, and so forth. The communications may be authenticated, encrypted, and so forth.

The memory 320 may also store an analysis module 328 and a status module 330. The analysis module 328 may process sensor data 140 to determine the device data 162. The device data 162 may then be processed by the status module 330 to determine the status data 164. In some implementations, one or more of the analysis module 328 or the status module 330 may use the threshold data 168 during operation. The analysis module 328 and the status module 330 are discussed in more detail with respect to FIG. 4.

A local monitor module 332 may operate at least a portion of the enhanced circuit breaker 108. The local monitor module 332 may determine, such as using the one or more processors 132 of the enhanced circuit breaker 108, control data 170 that may then be used to operate the enhanced circuit breaker 108. The local monitor module 332 may operate without communication to the monitor module 166 executing on the computing device 160. The local monitor module 332 is thus able to provide a low latency response. For example, responsive to status data 164 indicative of a fault condition, the local monitor module 332 may operate the switch actuator 118 to actuate the trip mechanism 214 and open the main switch 116. The local monitor module 332 may then send status data 164 indicative of the fault and the actuation of the trip mechanism 214 to the monitor module 166. In some implementations the local monitor module 332 may be implemented at least in part as dedicated circuitry. The local monitor module 332 may perform one or more of the operations described with respect to the monitor module 166.

The local monitor module 332 may respond to control data 170 received via the communication interface 134. For example, the local monitor module 332 may receive the control data 170 from the computing device 160 and operate the enhanced circuit breaker 108 based on the control data 170. In some implementations the local monitor module 332 may also determine and send notification data 172.

Other modules 340 may also be present in the memory 320 as well as other data 390 in the data store 324.

Figure 4:
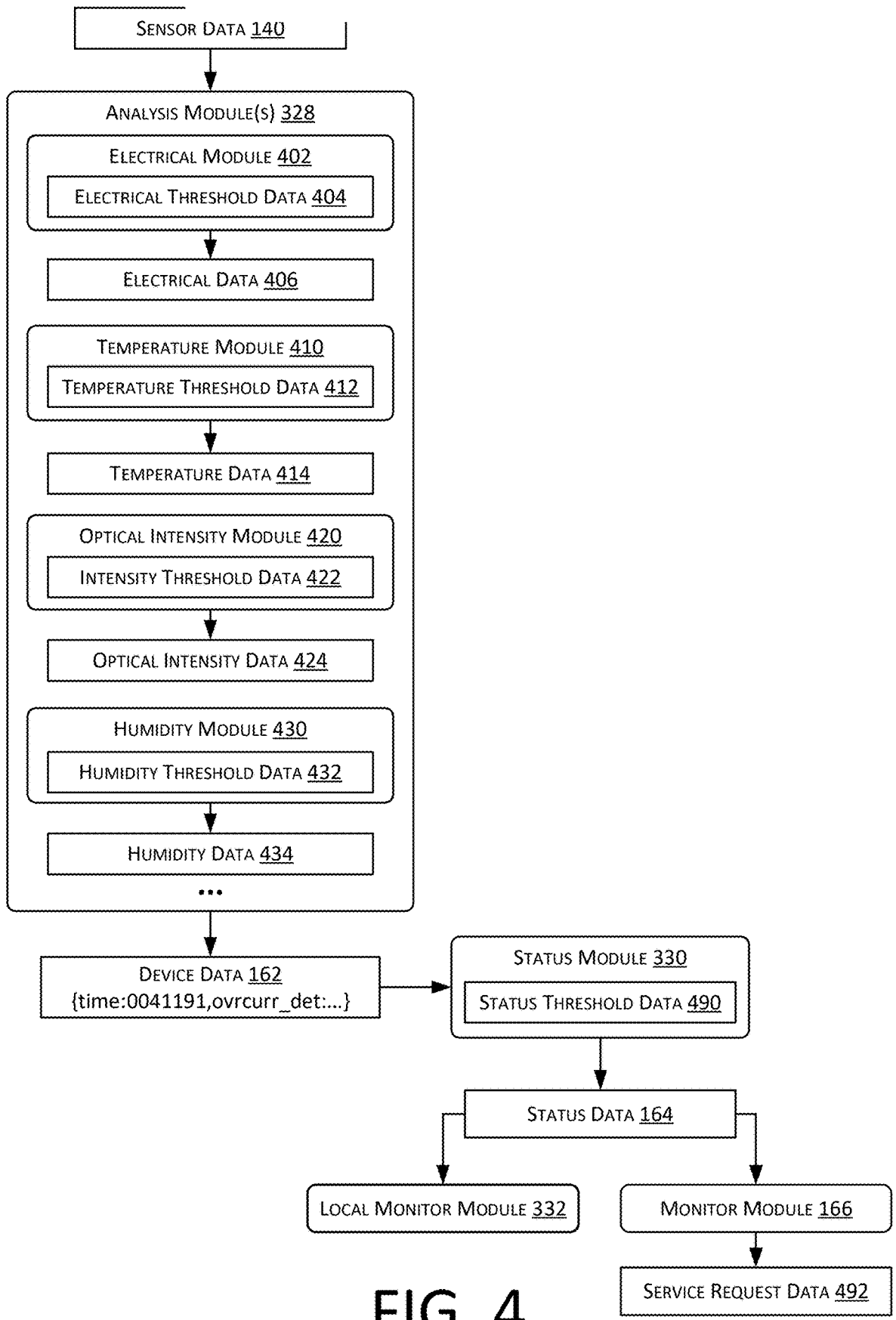
FIG. 4 is a block diagram of processing sensor data to determine status data, according to some implementations.

FIG. 4 is a block diagram 400 of processing sensor data 140 to determine status data 164, according to some implementations. The processing may be performed by one or more of the processors 132, computing device 160, and so forth.

The analysis module 328 receives the sensor data 140 and processes it with one or more modules. For example, the modules may include one or more of an electrical module 402, temperature module 410, optical intensity module 420, humidity module 430, and so forth. Each of the modules may use sensor data 140 from one or more sensors 136.

The device data 162 may be associated with a specified time interval. In some implementations, the cadence at which device data 162 is determined (or data acquisition frequency) may be based on the frequency of the AC waveform or line frequency.

The electrical module 402 may use data acquired by the one or more electrical sensors 136(1) to determine electrical data 406. For example, the electrical sensor(s) 136(1) may determine a peak electrical current draw for a specified period of time, presence of a ground fault, and so forth.

The electrical module 402 may compare sensor data 140 to electrical threshold data 404 to determine electrical data 406. In some implementations the electrical threshold data 404 may specify a threshold current value. The threshold current value may specify a value that is less than that associated with a fault. For example, a maximum safe current rating for the enhanced circuit breaker 108 and associated wiring of the electrical branch circuit 110 may be 20 amps, while the threshold current value has been set to 15 amps. If the current value as indicated by the sensor data 140 exceeds the threshold current value, then an excessive current event may be determined. Responsive to this, the switch actuator 118 may be operated to open the load switch 114. This allows the user to selectively tune operation of the electrical system. For example, the user may wish to discourage the use of electrical space heaters on a specified electrical branch circuit 110. Based on this, the user may set a threshold current value sufficient for non-space heater loads. In comparison, if the maximum safe current rating is exceeded, the switch actuator 118 may be operated at a first time to trip the trip mechanism 214 and open the main switch 116. In some implementations, the switch actuator 118 may then be operated at a second time to also open the load switch 114, providing redundancy in the de-energizing the electrical branch circuit 110.

The temperature module 410 may compare sensor data 140 acquired by the temperature sensor 136(2) to temperature threshold data 412 to determine temperature data 414. For example, the temperature threshold data 412 may specify a maximum permitted temperature. If the sensor data 140 indicates that a temperature has been detected that is greater than the maximum permitted temperature, the temperature data 414 may be indicative of this. In some implementations, the temperature threshold data 412 may be determined based on the materials associated with the monitored devices. For example, the temperature threshold data 412 may be determined based on flashpoints for building materials, insulation, materials used in the electrical branch circuit 110, the load 112, and so forth.

The optical intensity module 420 may compare sensor data 140 to intensity threshold data 422 to determine optical intensity data 424. For example, the intensity threshold data 422 may specify a set of ranges of intensity of light indicated by the photoresistor 136(3), set of ranges of intensity of light indicated by the infrared sensor 136(4), and so forth. Each range may be associated with a particular intensity value. For example, a lookup table may be used to relate a first value of sensor data 140 associated with the photoresistor 136(3) and a second value of sensor data 140 associated with the infrared sensor 136(4) to determine a particular value of optical intensity data 424.

In one implementation, the optical intensity module 420 may process sensor data 140 from a plurality of optical sensors 136 that are responsive to different wavelengths. For example, the optical intensity module 420 may accept input from photoresistors 136(3) that are sensitive to ultraviolet light, infrared sensors 136(4) sensitive to infrared light, and so forth. In another implementation, different optical intensity modules 420 may be used, with each processing sensor data 140 associated with a different range of wavelengths, such as ultraviolet, infrared, and so forth.

The optical intensity module 420 may use one or more fixed thresholds, or a dynamically adjustable threshold. The enclosure surrounding the sensors 136 may be opaque, preventing external light from impinging thereon. In some implementations, ambient light leakage may be compensated for by either setting a fixed threshold value or by dynamically adjusting the threshold value.

The humidity module 430 may compare sensor data 140 acquired by the humidity sensor 136(5) to humidity threshold data 432 to determine humidity data 434. For example, the humidity threshold data 432 may specify a maximum humidity. If the sensor data 140 indicates that humidity has been detected that is greater than the maximum humidity, the humidity data 432 may be indicative of this.

In some implementations, the modules of the analysis module 328 may provide output that is single bit, multiple bit, and so forth. For example, the electrical module 402 may determine electrical data 406 comprising a first single bit value in which "1" indicates "excessive current detected", and "0" indicates "no excessive current detected". In another example, the temperature module 410 may determine temperature data 414 comprising a second single bit value of "1" may indicate "maximum temperature exceeded". Different modules may report different values. For example, the humidity module 430 may report humidity data 434 comprising a single bit indicative of high or low humidity, while the electrical data 406 comprises an 8 bit value.

In some implementations, the modules of the analysis module 328 may reduce data transfer by only reporting data that is out of a specified range, exceeds a threshold value, is less than a threshold value, and so forth. For example, the modules may determine output data in the event of an exceptional condition, and not provide output data if a normal condition is observed.

In some implementations one or more of the thresholds may be determined as part of initial calibration or installation. For example, after installation, the enhanced circuit breaker 108 may acquire sensor data 140 and determine the electrical threshold data 404, intensity threshold data 422, the temperature threshold data 412, and so forth. Continuing the example, sensor data 140 acquired after installation using electrical sensors 136(1), temperature sensors 136(2), photoresistors 136(3), infrared sensors 136(4), and so forth may be used to determine respective threshold values for subsequent analysis.

The status module 330 accepts as input the device data 162 and determines status data 164. The status module 330 may use status threshold data 490 specifying one or more threshold values, ranges, and so forth to determine the status data 164. The status module 330 may use various combinations of individual elements of device data 162 to determine the status data 164. The thresholds associated with some statuses may be based on one or more of electrical data 406, temperature data 414, humidity data 434, and so forth. Faults may be more prone to occurring during particular environmental conditions. For example, the threshold for determining a critical fault may be lower in situations of temperature greater than 35 degrees Centigrade and relative humidity that is greater than 95%. In comparison, the threshold for determining the critical fault may be relatively greater in colder and drier conditions.

In some implementations, the sequence or order in which particular phenomena are observed in the sensor data 140 may be used to determine the status data 164. In one implementation, a fault may be deemed to occur if a particular phenomenological order is observed. For example, a current value associated with a first time exceeds a first threshold value. Next, a temperature value at the lead terminal that is associated with a second time after the first time exceeds a second threshold value. Based on this sequence, the status module 330 may determine status data 164 indicative of a fault. In some implementations other phenomena may also be included in the ordered determination. For example, an optical intensity value associated with a fourth time after the third time that exceeds a fourth threshold value may be used by the status module 330 to determine the status data 164.

The status data 164 may be indicative of specified status types, such as "non-fault", "warning fault", "critical fault", "load switch open", "main switch tripped", and so forth. Different status types may be indicative of different severity, type of failure, and so forth. For example, the status data 164 may indicate "critical fault on the hot wire", "warning over temperature", and so forth.

The status module 330 may utilize one or more of deterministic analysis algorithms, machine learning systems, and so forth. For example, the status module 330 may utilize one or more classifiers that accept the device data 162 as input and provide as output the status data 164.

In some implementations one or more of the sensor data 140, the device data 162, or the status data 164 may be assessed for failure prediction. For example, the device data 162 may be assessed to determine a baseline set of temperature values associated with particular current flow. In the event of an incipient failure, such as due to a load terminal screw that is loosening due to thermal cycling effects, an increasing trend in temperature values over time may be detected and used to generate status data 164. In another example, the device data 162 may be assessed to determine a baseline set of peak current values associated with operation of the load 112. A deviation of a subsequent peak current value that deviates from the baseline by more than a threshold value may be indicative of an incipient failure. In such an event, status data 164 may be generated indicative of this deviation.

In some implementations, the failure prediction may be performed by the monitor module 166. For example, the enhanced circuit breaker 108 may send device data 162 to the monitor module 166. The monitor module 166 may then determine the status data 164.

The status data 164 may then be provided to one or more of the local monitor module 332 or the monitor module 166.

One or more of the local monitor module 332 or the monitor module 166 may be operated based on the status data 164.

In some implementations, one or more of the monitor module 166 or the local monitor module 332 may generate service request data 492. The service request data 492 may be sent using a communication interface to another computing device. For example, the service request data 492 may be indicative of a detect fault, an incipient fault, information about the fault, identification of the enhanced circuit breaker 108, and other information. Responsive to the service request data 492, additional actions may be undertaken. For example, after receiving the service request data 492, a service technician may be dispatched to inspect and remedy any problems.

Figure 5:
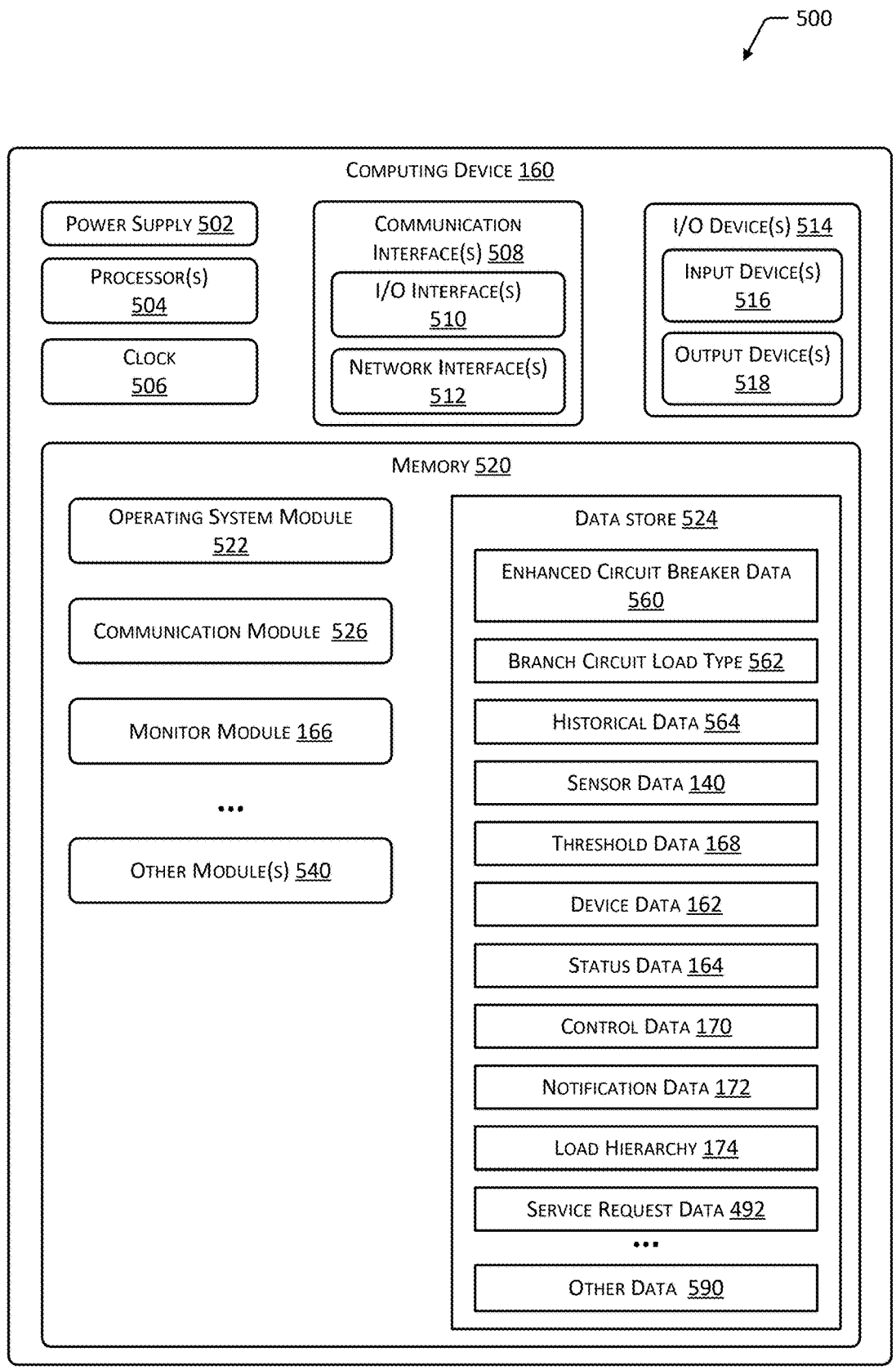
FIG. 5 is a block diagram of a computing device, according to some implementations.

FIG. 5 is a block diagram 500 of a computing device 160, according to some implementations. The computing device 160 may be implemented as one or more of an embedded system, system on a chip, discrete circuitry, and so forth.

One or more power supplies 502 may be configured to provide electrical power suitable for operating the components in the computing device 160. The one or more power supplies 502 may comprise capacitors, batteries, connections to the electrical branch circuit 110, and so forth. In some implementations, the power supply 502 may be configured to provide electrical power to the computing device 160 after the electrical branch circuit 110 is no longer energized.

The computing device 160 may include one or more hardware processors 132 (processors) configured to execute one or more stored instructions. For example, the hardware processors 132 may include ASICs, FPGAs, DSPs, and so forth. The processors 132 may comprise one or more cores. One or more clocks 506 may provide information indicative of date, time, ticks, and so forth.

The computing device 160 may include one or more communication interfaces 508 such as I/O interfaces 510, network interfaces 512, and so forth. The communication interfaces 508 enable the computing device 160, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), and so forth.

The I/O interface(s) 510 may couple to one or more I/O devices 514. The I/O devices 514 may include input devices such as one or more of input device 516 such as a touchscreen, keyboard, mouse, microphone, and so forth. The I/O devices 514 may also include output devices 518 such as one or more of a display device, printer, audio speakers, and so forth. In some embodiments, the I/O devices 514 may be physically incorporated with the computing device 160 or may be externally placed.

The network interfaces 512 may be configured to provide communications between the computing device 160 and other devices, such as routers, wireless access points, user devices 152, and so forth. The network interfaces 512 may include devices configured to couple to PANs, LANs, PCNs, WLANS, WANs, and so forth. For example, the network interfaces 512 may include devices compatible with Ethernet, WiFi, Bluetooth, IEEE 1901 standard, X10, and so forth.

The computing device 160 may also include one or more buses or other internal communications hardware or software that allow for the transfer of data between the various modules and components of the computing device 160.

As shown in FIG. 5, the computing device 160 includes one or more memories 520. The memory 520 may comprise one or more non-transitory CRSM. The memory 520 provides storage of computer-readable instructions, data structures, program modules, and other data for the operation of the computing device 160. Some functional modules are shown stored in the memory 520, although the same functionality may alternatively be implemented in hardware, firmware, as a system on a chip (SoC), dedicated circuitry, and so forth.

The memory 520 may include at least one OS module 522. The OS module 522 is configured to manage hardware resource devices such as the I/O interfaces 510, the I/O devices 514, the communication interfaces 508, and provide various services to applications or modules executing on the processors 132. The OS module 522 may implement a variant of the FreeBSD operating system as promulgated by the FreeBSD Project; other UNIX or UNIX-like variants; a variation of the Linux operating system as promulgated by Linus Torvalds; FreeRTOS; Zephyr; VxWorks; and so forth.

Also stored in the memory 520 may be a data store 524 and one or more of the following modules. For example, these modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other computing devices 160, network attached storage devices, and so forth.

The data store 524 may store one or more of enhanced circuit breaker data 560, branch circuit load type 562, historical data 564, sensor data 140, threshold data 168, device data 162, status data 164, control data 170, notification data 172, load hierarchy 174, service request data 492, or other data 590.

The enhanced circuit breaker data 560 may comprise information about one or more of the enhanced circuit breakers 108 or other devices that are participating in the system 100. For example, the enhanced circuit breaker data 560 may comprise a network address, model number, installation information with respect to the distribution panelboard 104, and so forth. The enhanced circuit breaker data 560 may also include data indicative of functionality provided, such as whether enhanced circuit breaker 108 provides one or more of current-limit protection, AFCI, GFCI, or other functions. The enhanced circuit breaker data 560 may also include data indicative of an association between a particular enhanced circuit breaker 108 and the load(s) 112 that are connected to the electrical branch circuit 110 of the enhanced circuit breaker 108.

The branch circuit load type 562 may comprise data indicative of the type of loads 112 that are attached to a particular electrical branch circuit 110. For example, the types may include "electric vehicle charger", "hot water heater", "dedicated appliance-microwave oven", "dedicated appliance-dishwasher", "dedicated appliance-furnace", "room lighting", "room electrical receptacles", "bathroom", "kitchen", "motor", and so forth.

The historical data 564 may comprise previously received or processed information, or summary data based thereon. For example, the historical data 564 may comprise data indicative of a particular enhanced circuit breaker 108 and previous status data 164 associated with that enhanced circuit breaker 108.

In some implementations, the enhanced circuit breaker(s) 108 may send device data 162 to the computing device 160.

The computing device 160 may then include in memory 520 the analysis module(s) 328 and status module 330 or equivalent functionality to determine status data 164.

A communication module 526 may be configured to establish communications with other devices, such as one or more enhanced circuit breakers 108, other computing devices 160, and so forth. The communications may be authenticated, encrypted, and so forth.

The memory 520 may store the monitor module 166. The monitor module 166 may accept as input one or more of the device data 162, status data 164, user request data 154, remote request data 182, and so forth that is associated with one or more enhanced circuit breakers 108 and determine one or more of control data 170, notification data 172, or other data.

In one implementation, the monitor module 166 may determine one or more of the threshold data 168 to process the device data 162 or the status data 164 based on one or more of the enhanced circuit breaker data 560, the branch circuit load type 562, historical data 564, or other data 590. For example, lower threshold values may be selected from the threshold data 168 for a branch circuit load type 562 of "bathroom" compared to a branch circuit load type 562 of "electric vehicle charger".

The monitor module 166 may utilize one or more of deterministic analysis algorithms, machine learning systems, and so forth. For example, the monitor module 166 may utilize one or more neural networks that accept the status data 164 and provide as output one or more of control data 170 or notification data 172.

In some implementations the monitor module 166 may determine failure predictions. These failure predictions may be based on data received from one or more enhanced circuit breakers 108. For example, a failure prediction may be determined based on a change in temperature data relative to a previously observed baseline of current flow. In this example, an average relative temperature differential is calculated as a difference between the internal temperature sensor 136(2)(2) and the ambient temperature sensors 136(2)(1). Over the previous 10 weeks while drawing 13 amps peak, the average relative temperature differential was 17.3° F. However, over the previous seven days, while drawing the same 13 amps peak, the average relative temperature differential has increased to 21.1° F. Based on this increase, a fault may be predicted.

The monitor module 166 may consider data from more than one enhanced breaker device 108 while determining status data 164, control data 170, and so forth. For example, based on the enhanced circuit breaker data 560, the monitor module 166 may determine which enhanced circuit breakers 108 are physically adjacent to one another within the distribution panelboard 104, which busbars they are connected to, and so forth. For example, if several physically adjacent enhanced circuit breakers 108 attached to a first busbar report temperatures that are greater than other non-adjacent enhanced circuit breakers 108 on a second busbar, this may be indicative of a fault on the first busbar, such as corrosion or contamination by a foreign substance.

The monitor module 166 may determine and send, using the communication interface(s) 508, the control data 170 to one or more enhanced circuit breakers 108 or other devices. For example, if the monitor module 166 determines an "imminent fault" at an enhanced circuit breaker 108, the monitor module 166 may send control data 170 to the enhanced circuit breaker 108. The control data 170 may operate the enhanced circuit breaker 108 to disconnect the electrical branch circuit 110 from the mains 102, de-energizing the electrical branch circuit 110.

The monitor module 166 may determine and send, using the communication interface(s) 508, the notification data 172. For example, the notification data 172 may comprise text, hypertext markup language (HTML) instructions, audio data, image data, and so forth. The notification data 172 may provide information such as the status of a particular enhanced circuit breaker 108, overall status of the system 100, mitigating actions taken such as de-energizing or re-energizing an electrical branch circuit 110, and so forth.

With respect to the enhanced circuit breaker 108, in some implementations, the threshold data 168 used by the analysis module(s) 328 may be set based on one or more of the enhanced circuit breaker data 560, the branch circuit load type 562, the historical data 564, or other data 590. For example, the monitor module 166 may send control data 170 to the enhanced circuit breaker 108 to set one or more of the threshold values or ranges of the analysis module(s) 328 of the enhanced circuit breaker 108.

During operation, the monitor module 166 may also utilize the load hierarchy 174 as described above. For example, upon receiving a request to reduce power consumption, the monitor module 166 may use the load hierarchy 174 to determine which enhanced circuit breakers 108 will be operated to de-energize their associated electrical branch circuits 110 and loads 112. Continuing the example, responsive to a power conservation event as indicated by remote request data 182 from a local utility, the monitor module 166 may use the load hierarchy 174 to determine that the electric vehicle charger is the first load to shed. Responsive to this, the monitor module 166 sends control data 170 to the enhanced circuit breaker 108(1) that supplies power to the electric vehicle charger. Responsive to the control data 170, the enhanced circuit breaker 108(1) opens the load switch 114, shedding the load 112. Responsive to another remote request data 182 corresponding to an increased severity in the power conservation event, the monitor module 166 may use the load hierarchy 174 to determine that the hot water heater is the second load to shed. Responsive to this, the monitor module 166 sends control data 170 to the enhanced circuit breaker 108(2) that supplies power to the hot water heater. Responsive to the control data 170, the enhanced circuit breaker 108(2) opens the load switch 114, shedding the load 112. At a later time, the monitor module 166 may send further control data 170 to operate the load switches 114 of the enhanced circuit breakers 108 to re-energize the respective electrical branch circuits 110 and provide power to the attached load(s) 112. In one implementation, the monitor module 166 may re-energize the electrical branch circuits 110 at a previously specified time, after a specified time interval has passed, after receipt of remote request data 182, user request data 154, and so forth.

In some implementations, the monitor module 166 may send notification data 172 indicative of a proposed action, and request confirmation from the user before proceeding with operating the enhanced circuit breaker 108. For example, remote request data 182 may be received requesting voluntary power reductions. Responsive to this, the monitor module 166 may send notification data 172 to this effect to the user device 152. Responsive to this, the user may provide via a user interface of the user device 152 a command to comply with the voluntary power reductions or not. If the user so chooses to voluntarily reduce power consumption, the monitor module 166 may send control data 170 to de-energize one or more electrical branch circuits 110, such as specified by the load hierarchy 174. In some implementations the user may use the user device 152 to override or specify modifications to the load hierarchy 174. For example, the user may choose to override and continue powering the electric vehicle charger, but choose to de-energize the air conditioner and hot water heaters.

Other modules 540 may also be present in the memory 520 as well as other data 590 in the data store 524. For example, a web server module may provide a web interface to provide a user interface to allow a user to set thresholds, view current status, configure one or more portions of the system 100, and so forth.

The computing device 160 may be in communication with other devices. For example, the network interface(s) 512 may be used to provide communication between the computing device 160 and an external server associated with a facilities service provider, facilities monitoring service, and so forth. Subject to the user approving such communication, the computing device 160 may send service request data 492 to the external server.

In some implementations, one or more of the monitor module 166 or the local monitor module 332 may generate service request data 492. The service request data 492 may be sent using the communication interface 508 to another computing device. For example, the service request data 492 may be indicative of a detected fault, an incipient fault, information about the fault, identification of the enhanced circuit breaker 108, or other information. Responsive to the service request data 492, additional actions may be undertaken. For example, after receiving the service request data 492 a service technician may be dispatched to inspect and remedy any problems. In some situations, the service request data 492 may include information about operation of the enhanced circuit breaker 108, such as historical data 564.

Figure 6:
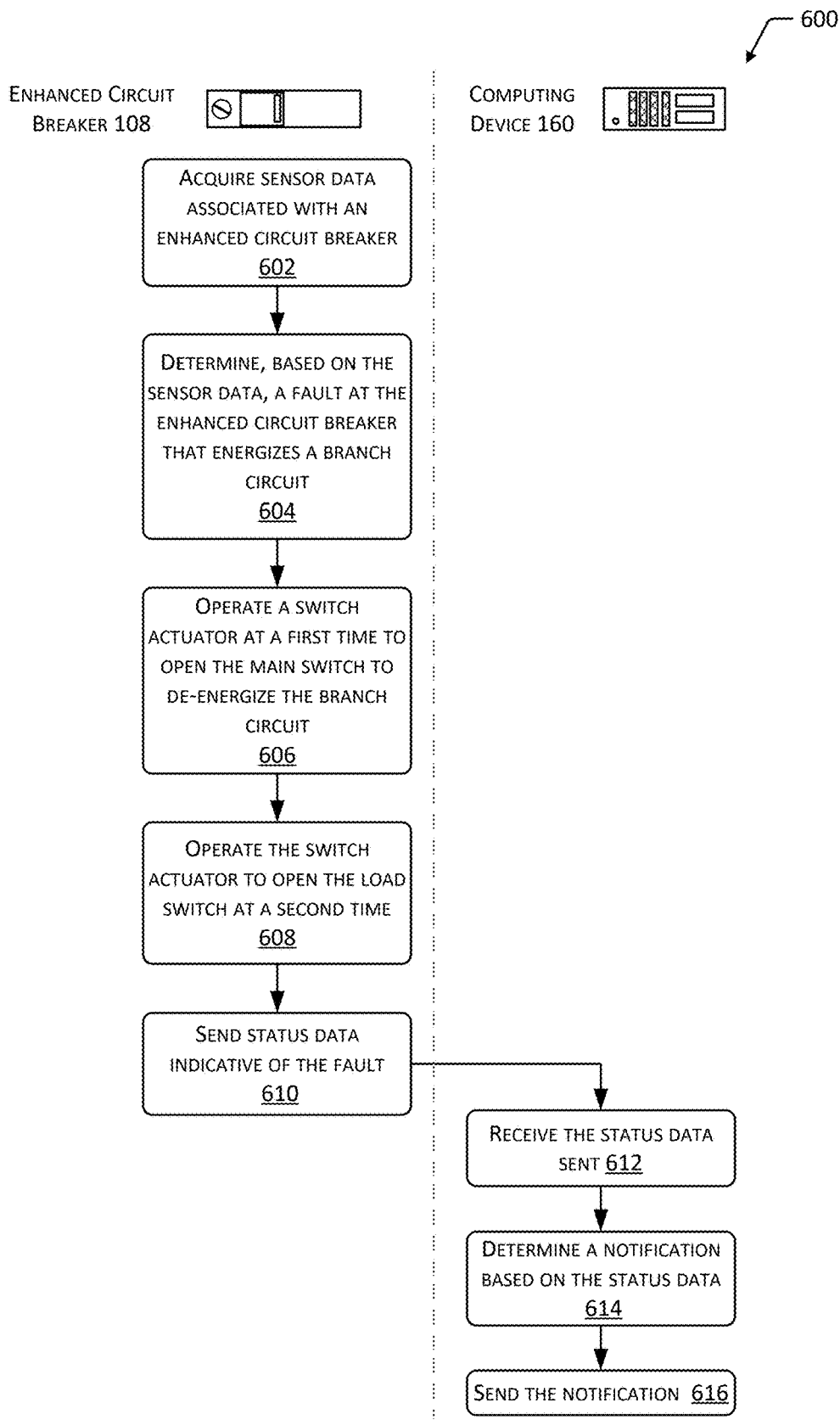
FIG. 6 is a flow diagram of a process to operate an enhanced circuit breaker during a fault, according to some implementations.

FIG. 6 is a flow diagram 600 of a process to operate an enhanced circuit breaker 108 during a fault, according to some implementations. The process may be implemented by one or more of the enhanced circuit breaker 108, the computing device 160, or other devices. In some implementations, one or more of the steps of the process described may be performed by different devices. In some implementations, to provide redundancy in de-energizing the electrical branch circuit 110, the enhanced circuit breaker 108 may operate the main switch 116 to open and then the load switch 114 to open.

At 602 sensor data 140 is acquired using one or more sensors 136 at the enhanced circuit breaker 108. For example, the signal circuitry 138 may be operated to determine the sensor data 140.

At 604, based on the sensor data, a fault is determined. For example, the analysis module 328 executing on the enhanced circuit breaker 108 may determine that a fault condition exists.

In some implementations, control data 170 may be determined. For example, the local monitor module 332 may determine control data 170 to operate the switch actuator 118 as described below. The control data 170 may be indicative of opening the main switch 116 followed by the load switch 114. In some implementations the control data 170 may comprise an analog signal.

At 606 a switch actuator 118 is operated at a first time to open the main switch 116. For example, the switch actuator 118 is operated to actuate the trip mechanism 214, separating the third contact 210(3) and the fourth contact 210(4) and disconnecting the load power terminal 206(2) from the line terminal 204. The switch actuator 118 may be operated at the first time responsive to the control data 170. In implementations in which the control data 170 comprises an analog signal, the switch actuator 118 may be operated at the first time responsive to the analog signal.

At 608 the switch actuator 118 is operated at a second time to open the load switch 114. For example, the switch actuator 118 is operated to separate the first contact 210(1) from the second contact 210(2). This provides a redundant mechanism to de-energize the electrical branch circuit 110, in the event of a failure of the main switch 116.

The switch actuator 118 may be operated at the second time responsive to the control data 170. In implementations in which the control data 170 comprises an analog signal, the switch actuator 118 may be operated at the second time responsive to the analog signal.

At 610 status data 164 indicative of the fault is sent to the computing device 160. For example, the analysis module 328 may determine device data 162 that is then processed by the status module 330 to determine the status data 164. Continuing the example, the enhanced circuit breaker 108 may use the communication interface 134 to send the status data 164.

At 612 the status data 164 is received by the computing device 160.

At 614 the computing device 160 determines notification data 172 based on the status data 164. For example, the status data 164 may include one or more of a network address associated with the enhanced circuit breaker 108, a device identifier associated with the enhanced circuit breaker 108, a circuit breaker identifier as previously stored by the enhanced circuit breaker 108, and so forth. In one implementation, the monitor module 166 may access the enhanced circuit breaker data 560 and determine the electrical branch circuit 110, load 112, or other information that are associated with the status data 164 and determine the notification data 172.

At 616 the computing device 160 may send the notification data 172. For example, the notification data 172 may be sent to the user device 152. The message may advise as to the type of the fault and the location on the premises. For example, the message may state "A problem with a circuit breaker that powers the electric vehicle charger. The circuit breaker has been turned off for your safety. Please call an electrician for service."

Figure 7:
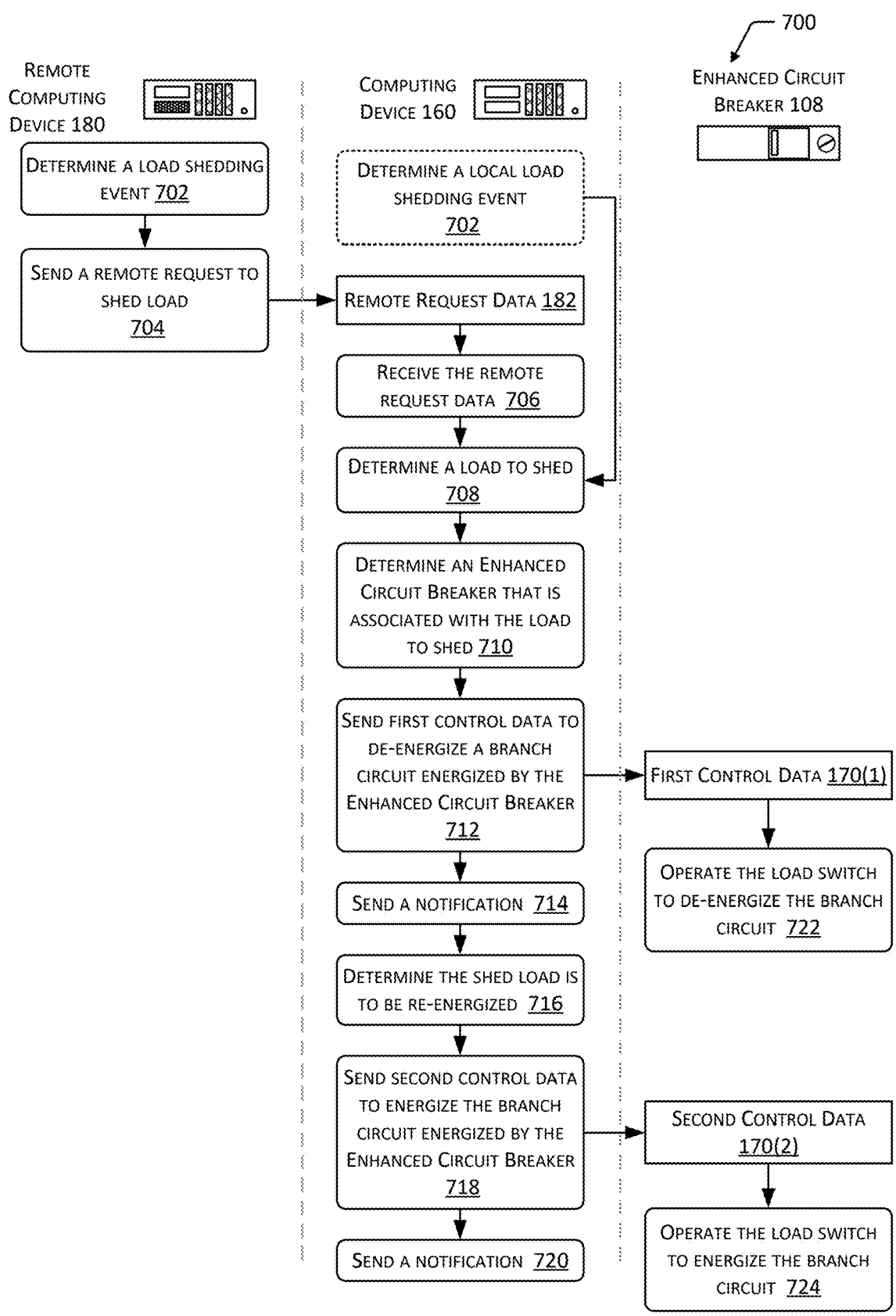
FIG. 7 is a flow diagram of a process to operate an enhanced circuit breaker responsive to a determination to shed load, according to some implementations.

FIG. 7 is a flow diagram 700 of a process to operate an enhanced circuit breaker 108 responsive to a determination to shed load, according to some implementations. The process may be implemented by one or more of the enhanced circuit breaker 108, the computing device 160, or other devices. In some implementations, one or more of the steps of the process described may be performed by different devices.

In some implementations, load 112 may be shed, or disconnected from the mains 102, for a variety of reasons. For example, demand for electrical power that exceeds available power supply may necessitate reduction in that demand by selective disconnection of loads 112 to maintain desired function of the electrical grid. In another example, costs associated with electrical power generation at a particular time may exceed a threshold value, and a reduction in demand by selective disconnection of loads 112 may be used to reduce those costs. In yet another example, in the event of an impending or in-progress emergency, it may be advantageous to disconnect loads to minimize subsequent damage. Continuing this example, in advance of arrival of a hurricane, a user may send user request data 154 to open all load switches 114 or open all main switches 116 to de-energize electrical branch circuits 110 before arrival of the hurricane.

Regardless of the circumstances, the enhanced circuit breaker 108 may be operated to one or more of selectively disconnect and reconnect a load 112 using the load switch 114, or trip the trip mechanism 214 disconnecting the load 112 and requiring manual intervention to reconnect the load 112.

At 702 a remote computing device 180 determines a load shedding event. For example, the remote computing device 180 may be associated with an electrical utility operator who has determined, based on available power generation resources, current demand, and grid line frequency, that overall demand on the grid is or will exceed the capacity of available power generation resources.

At 704 the remote computing device 180 sends a remote request to shed load. For example, the remote computing device 180 may send remote request data 182 to the computing device 160. The remote request data 182 may specify one or more parameters, such as a date and time to perform the load shedding, a duration, amount of power to shed, data indicative of severity of the request such as whether this is optional or mandatory, and so forth.

It is understood that other systems may be intermediary between the remote computing device 180 and the computing device 160. For example, the remote computing device 180 of the electrical utility may securely communicate with servers that facilitate operation of the system 100, that are in turn in communication with one or more computing devices 160 that are associated with operation of many different distribution panelboards 104 and their associated enhanced circuit breakers 108. These intermediary systems are omitted for clarity of illustration.

At 706 the remote request data 182 is received by the computing device 160. For example, the remote request data 182 may be received by the communication interface 508 of the computing device 160.

At 708 an electrical branch circuit 110 or load 112 is determined to shed. For example, the monitor module 166 may receive the remote request data 182 and use the load hierarchy 174 to determine which electrical branch circuits 110 and associated loads 112 will be de-energized. In some implementations, other data such as the branch circuit load type 562, historical data 564, and so forth may be used to determine the load(s) 112 to shed.

In some implementations, instead of or in addition to the remote request data 182, the computing device 160 may determine a local load shedding event 720. For example, based on one or more of the device data 162 or the status data 164, the monitor module 166 executing on the computing device 160 may determine that overall power consumption is exceeding a specified threshold. In another example, the monitor module 166 may shed load during specified times of day, during particular conditions, and so forth. For example, if the mains 102 obtain power from a local photovoltaic array, during cloudy weather the monitor module 166 may shed load. If a local load shedding event is determined, the process may proceed to 708.

At 710 an enhanced circuit breaker 108 that is associated with the load 112 to shed is determined. For example, the enhanced circuit breaker data 560 may indicate that the load 112 "hot water heater" is associated with enhanced circuit breaker 108(17).

At 712 first control data 170(1) is sent to the enhanced circuit breaker 108 associated with the load to shed. For example, the computing device 160 may use the communication interface 508 to send the first control data 170(1) to the enhanced circuit breaker 108.

At 722 the first control data 170(1) is received by the enhanced circuit breaker 108 that subsequently operates the load switch 114 to de-energize the electrical branch circuit 110. For example, the switch actuator 118 may be operated to open the load switch 114. With the load switch 114 open, the electrical branch circuit 110 and associated load 112 is disconnected from the mains 102.

Returning to the computing device 160, at 714 a notification is sent. For example, the monitor module 166 may generate notification data 172 that is then sent to the user device 152. Continuing the example, the notification may specify that a load shedding event has taken place and what load 112 has been disconnected. Other information such as the expected duration of the load shedding may also be included.

In some implementations the load shedding request may be presented to the user via a user interface presented using the user device 152. The user may then choose whether to perform the load shedding specified by the remote request data 182, or disregard the remote request data 182. In some implementations the user may be presented with one or more options as to which loads 112 to be shed. For example, responsive to the remote request data 182, the user interface may present to the user several options as to different loads 112 that may be shed, such as "hot water heater", "electric vehicle charger", "air conditioning", and so forth. Based on the user input provided, the corresponding operations may be performed by the system 100.

At 716 a determination to re-energize the shed load 112 is made. For example, the duration of the load shedding event may have expired, a predetermined amount of elapsed time may have passed, subsequent remote request data 182 may indicate the load shedding event is concluded and normal operation may resume, and so forth.

At 718 second control data 170(2) is sent to the enhanced circuit breaker 108 associated with the load 112 that was shed. For example, the computing device 160 may use the communication interface 508 to send the second control data 170(2) to the enhanced circuit breaker 108.

At 724 the second control data 170(2) is received by the enhanced circuit breaker 108 that subsequently operates the load switch 114 to energize the electrical branch circuit 110. For example, the switch actuator 118 may be operated to close the load switch 114. With the load switch 114 closed, the electrical branch circuit 110 and associated load 112 is connected to the mains 102.

Returning to the computing device 160, at 720 a notification is sent. For example, the monitor module 166 may generate notification data 172 that is then sent to the user device 152. Continuing the example, the notification may specify that a load shedding event is over and the load 112 has been reconnected.

In some implementations various communications between the computing device 160 and the enhanced circuit breaker 108 may take place. For example, the monitor module 166 may receive status data 164 from the enhanced circuit breaker 108 to confirm that the requested operation has taken place, before sending notifications to the user.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a device comprising:
        a line terminal configured to connect to a power source;
        a load terminal configured to connect to a load;
        one or more actuators to operate a first switch and a second switch;
        the first switch comprising:
            a first contact connected to the load terminal; and
            a second contact configured to be separated from the first contact by the one or more actuators;
        the second switch comprising:
            a third contact connected to the second contact of the first switch;

a fourth contact connected to the line terminal; and
a trip mechanism configured to separate the third contact and the fourth contact responsive to operation of the one or more actuators;
one or more sensors; and
control circuitry to:
acquire sensor data using the one or more sensors;
determine, based on the sensor data, a fault condition;
operate the one or more actuators at a first time to actuate the trip mechanism and open the second switch; and
operate the one or more actuators at a second time to open the first switch, wherein the second time is after the first time.

2. The system of claim 1, the one or more sensors comprising first circuitry to determine a zero crossing of an alternating current of the line terminal; and
the control circuitry further to:
determine the zero crossing of the alternating current at the second time.

3. The system of claim 1, wherein the fault condition is indicative of one or more of: a ground fault, an arc fault, or a short circuit.

4. The system of claim 1, wherein the fault condition is indicative of current flow to the load terminal that is greater than a first threshold and less than a maximum safe current rating.

5. The system of claim 1, wherein the one or more sensors comprise a temperature sensor; and
wherein the fault condition is indicative of a temperature value that is greater than a threshold temperature.

6. The system of claim 1, further comprising:
a communication interface; and
the control circuitry to:
send, using the communication interface, data indicative of the fault condition.

7. A system comprising:
a device comprising:
a line terminal configured to connect to a power source;
a load terminal configured to connect to a load;
one or more actuators;
a first switch comprising:
a first contact connected to the load terminal; and
a second contact configured to be separated from the first contact by the one or more actuators;
a second switch comprising:
a third contact connected to the second contact of the first switch;
a fourth contact connected to the line terminal; and
a trip mechanism configured to separate the third contact and the fourth contact responsive to operation of the one or more actuators; and
control circuitry to:
determine control data; and
responsive to the control data, operate the one or more actuators to:
open only one of the first switch or the second switch at a first time.

8. The system of claim 7, further comprising:
one or more sensors; and
the control circuitry to:
acquire sensor data using the one or more sensors; and
determine, based on the sensor data, the control data.

9. The system of claim 7, further comprising:
a communication interface; and
the control circuitry to:
receive, using the communication interface, the control data.

10. The system of claim 7, further comprising:
one or more sensors;
a communication interface; and
the control circuitry to:
acquire sensor data using the one or more sensors;
send, using the communication interface, one or more of the sensor data or data based on the sensor data; and
receive, using the communication interface, the control data.

11. The system of claim 7, wherein the one or more actuators are operated to:
operate the trip mechanism to open the second switch at the first time; and
open the first switch at a second time, wherein the second time is after the first time.

12. The system of claim 7, further comprising circuitry to determine a zero crossing of an alternating current of the line terminal; and
the control circuitry further to:
determine the zero crossing of the alternating current at the first time; and
wherein the one or more actuators operate to open the first switch at the first time.

13. The system of claim 7, further comprising circuitry to:
determine a fault condition that is indicative of one or more of: a ground fault, an arc fault, or a short circuit; and
the control circuitry further to:
determine the control data responsive to the fault condition; and
operate the one or more actuators to open the first switch or actuate the trip mechanism to open the second switch.

14. The system of claim 7, the control circuitry to:
determine a fault condition that is indicative of current flow to the load terminal that is greater than a first threshold and less than a maximum safe current rating; and
operate the one or more actuators to open the first switch or actuate the trip mechanism to open the second switch.

15. The system of claim 7, further comprising:
a temperature sensor; and
the control circuitry to:
acquire temperature data using the temperature sensor;
determine the control data responsive to the temperature data; and
operate the one or more actuators to open the first switch or actuate the trip mechanism to open the second switch.

16. A system comprising:
a device comprising:
a line terminal configured to connect to a power source;
a load terminal configured to connect to a load;
one or more actuators;
a first switch operated by the one or more actuators, the first switch comprising:
a first contact connected to the load terminal; and
a second contact;
a second switch operated by the one or more actuators, the second switch comprising:
a third contact connected to the second contact of the first switch;
a fourth contact connected to the line terminal; and a trip mechanism configured to separate the third contact and the fourth contact responsive to operation by the one or more actuators; and control circuitry to:
   determine control data; and
   responsive to the control data, operate the one or more actuators to operate either one of the first switch or the second switch at a first time.

17. The system of claim 16, further comprising:
one or more sensors; and
the control circuitry to:
   acquire sensor data using the one or more sensors; and
   determine, based on the sensor data, the control data.

18. The system of claim 16, further comprising:
a communication interface; and
the control circuitry to:
   receive, using the communication interface, the control data.

19. The system of claim 16, further comprising:
one or more sensors;
a communication interface; and
the control circuitry to:
   acquire sensor data using the one or more sensors;
   send, using the communication interface, one or more of the sensor data or data based on the sensor data; and
   receive, using the communication interface, the control data.

20. The system of claim 16, wherein the one or more actuators are operated to:
   operate the trip mechanism to open the second switch at the first time; and
   open the first switch at a second time, wherein the second time is after the first time.

\* \* \* \* \*